3,758,434
AROMATIC POLYIMIDES WITH INCREASED
SOLUBILITY
Hans-Egon Kunzel, Dormagen, Francis Bentz, Cologne,
and Gunther Nischk, Dormagen, Germany, assignors
to Bayer Aktiengesellschaft, Leverkusen, Germany
No Drawing. Filed Feb. 25, 1971, Ser. No. 118,960
Claims priority, application Germany, Mar. 3, 1970,
P 20 09 739.6
Int. Cl. C08g 20/32
U.S. Cl. 260—30.2                   10 Claims

ABSTRACT OF THE DISCLOSURE

New high molecular weight aromatic polyimides which are soluble in polar organic solvents. Obtained by reaction of a tetracarboxylic acid dianhydride with at least one diamine of the general formula

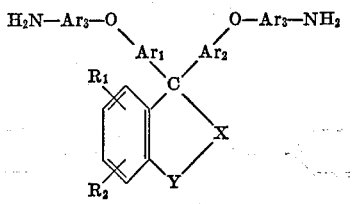

The polyimides are useful for the production of films, foils, fibers, coatings and moulded products.

---

The invention relates to new high molecular weight aromatic polyimides which have an increased solubility.

It is known that high molecular weight polyamidocarboxylic acids which can be converted by heating or by chemical treatment into the corresponding high molecular weight polyimides, which have excellent thermostability, can be prepared by reacting aromatic diamines such as 4,4'-diamino-diphenyl ether with tetracarboxylic acid dianhydrides such as pyromellitic acid dianhydride at temperatures below 60° C. A disadvantage of polyimides thus prepared is their low solubility in organic solvents which makes it impossible to work up the finished polyimides directly, for example into foils or threads. In all cases, working up must be carried out via the stage of polyamidocarboxylic acids. Cyclisation to form the polyimide must then be carried out subsequently in the finished foils and threads. This is in many cases a disadvantage because it requires long after-treatment times for the films and threads. The insolubility of the polyimides moreover makes it impossible to reuse the polyimide waste obtained in the course of working up the polyimide foils and threads.

It is also known that polyimides with a slightly higher solubility are obtained by using as the diamine component 3,3-bis-(4'-aminophenyl)-phthalides or -phthalimidines. Polyimides prepared from these diamines and pyromellitic acid dianhydride are still soluble in dimethyl formamide, dimethyl acetamide or N-methyl pyrrolidone after heating for 3 hours at 200° C. at a pressure of 1 mm. Hg (Vysokomol. Soed. 8, No. 5 (1966), 809–814). When heated to 270° C. to 280° C. at normal pressure even for only 5 minutes, however, these polyimides become insoluble in the aforementioned solvents even on heating. Moreover, the diamines used as starting compounds can only be prepared with very low yields (30% to 32%, loc. cit.).

It is an object of this invention to provide novel high molecular weight aromatic polyimides which are well soluble in polar organic solvents. Further objects of this invention will become evident from the following description. These objects are achieved by a high molecular weight aromatic polyimide having a molecular weight of at least 10,000 and a softening point above 300° C., comprising 50 to 100 mols percent of recurrent structural units of the general formula:

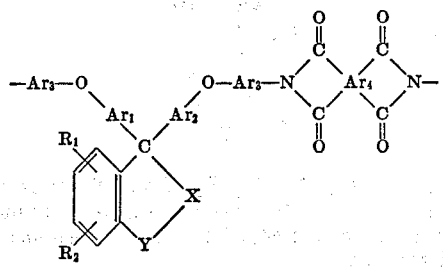

in which

Ar₁ and Ar₂, which may be the same or different, represent unsubstituted bivalent aromatic radicals, bivalent aromatic radicals substituted with at least one halogen, aryl or lower alkyl group, or bivalent aromatic radicals linked together by a bridging atom, an atomic group or a single bond;

Ar₃ represents an unsubstituted radical or an aromatic radical substituted with at least one halogen and lower alkyl group;

R₁ and R₂ represent, independently of each other, hydrogen, halogen, alkyl or aryl groups;

X represents oxygen or the group

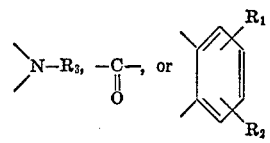

in which

R₃ represents hydrogen or an alkyl, aralkyl, unsubstituted aryl or substituted aryl group;

Y represents a single bond or the group

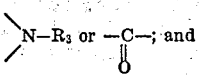

Ar₄ represents a tetravalent aromatic radical in which two pairs of carbonyl groups are present and in which each carbonyl group of said pair is in the ortho-position to the other carbonyl group;

and 0 to 50 mols percent of recurrent structural units of the general formula:

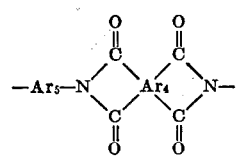

in which

Ar₄ has the meaning just defined, and
Ar₅ represents a bivalent aromatic radical.

These new high molecular weight aromatic polyimides are very stable at elevated temperatures and even after prolonged heating at 280° C. to 380° C., they can still be dissolved in polar organic solvents with slight heating. In some cases, these polyimides are even still soluble in hot dimethyl formamide after they have been heated at 280° C. for several days.

The novel high molecular weight aromatic polyimides according to the invention are obtained by a process which comprises reacting an aromatic tetracarboxylic acid dianhydride with 50 to 100 mols percent of an aromatic diamine having the General Formula I:

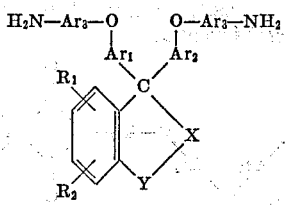

(I)

in which $Ar_1$, $Ar_2$, $Ar_3$, $R_1$, $R_2$, X and Y are as defined above, and with 0 to 50 mols percent, based on the total quantity of diamine used, of an aromatic diamine of the general formula:

$$H_2N-Ar_5-NH_2$$

in which $Ar_5$ is as defined above, said reaction being carried out in solution in a polar organic solvent at a temperature of from $-30°$ C. to $60°$ C., and converting the polyamidopolycarboxylic acid thus obtained into the polyimide by thermal or chemical ring closure, said ring closure being effected before or after a shaping process.

The polyimides are preferably prepared exclusively from diamines of Formula I.

The diamines used for the preparation of the polyimides according to the invention may be prepared in very high yields by reacting a dihydroxy compound of the general formula:

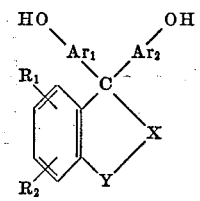

in which $Ar_1$, $Ar_2$, $R_1$, $R_2$, X and Y are as previously defined with an aromatic mononitrohalo compound in which one halogen atom is in the para-position to the nitro group, the reaction being carried out in the presence of an alkali metal hydroxide and in dimethyl sulphoxide as solvent, followed by catalytic hydrogenation of the resulting dinitro compound.

The following compounds are examples of suitable diamines for the preparation of the aromatic polyimides according to the invention:

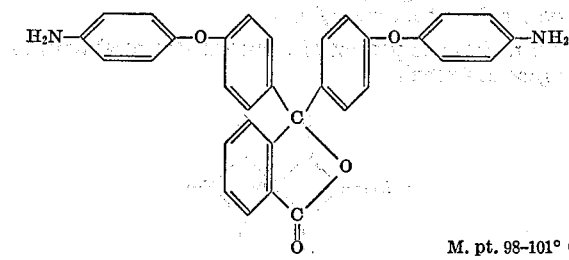

M. pt. 98–101° C.

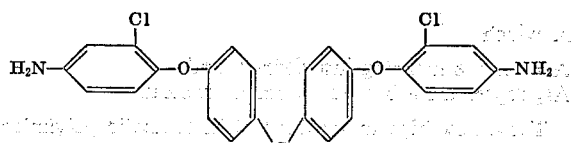

M. pt. 95–98° C.

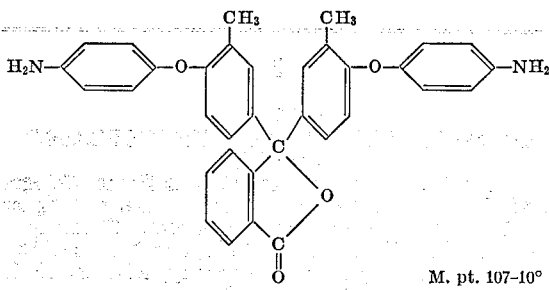

M. pt. 107–10° C.

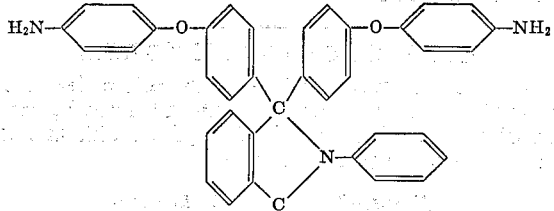

M. pt. 210–12° C

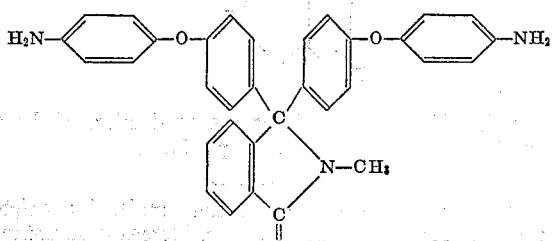

M. pt. 194–96° C.

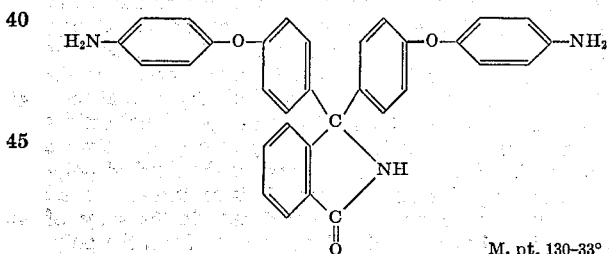

M. pt. 130–33° C.

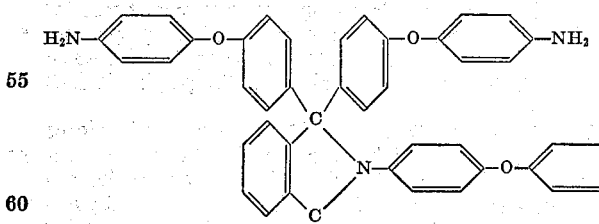

M. pt. 126–28° C

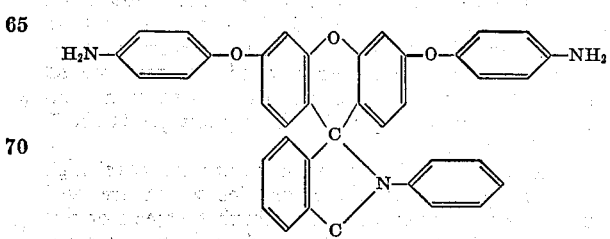

M. pt. 151–55° C

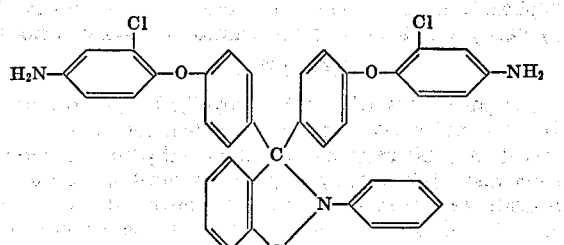

M. pt. 255-57° C

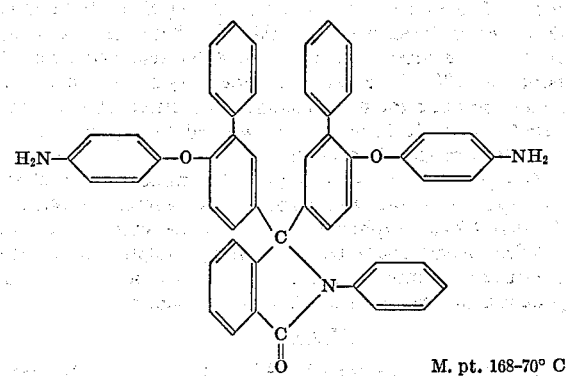

M. pt. 168-70° C

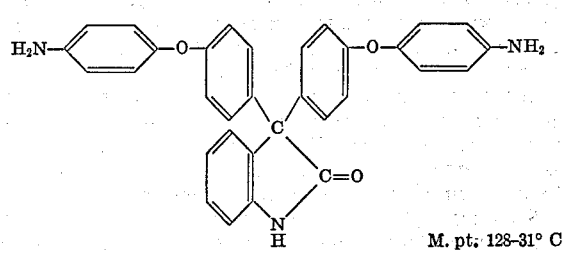

M. pt. 128-31° C

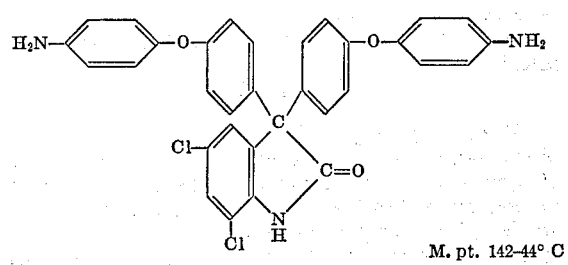

M. pt. 142-44° C

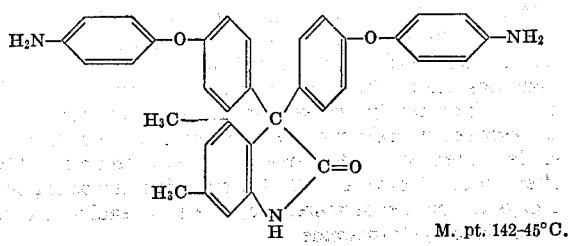

M. pt. 143-45°C.

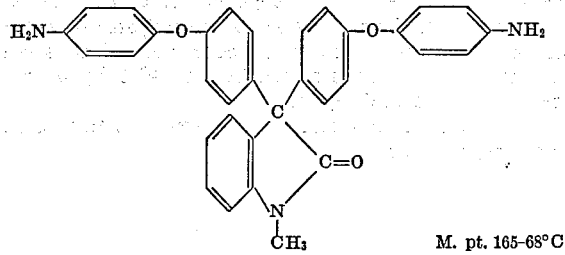

M. pt. 165-68°C.

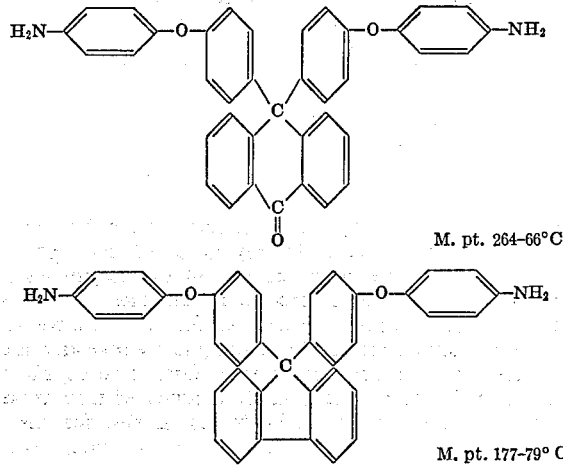

M. pt. 264-66°C.

M. pt. 177-79° C.

If desired, these diamines may also be used in admixture with other known diamines such as diaminodiphenyl ether, benzidine, diaminodiphenyl sulphone, or 4,4'-diaminodiphenyl oxadiazole, but these other known amines must not amount to more than 50 mols percent, based on the quantity of tetracarboxylic acid anhydride used.

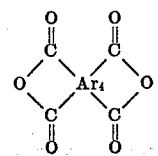

in which $Ar_4$ has the meaning already indicated, may be used as aromatic tetracarboxylic acid dianhydrides for the process according to the invention.

The following are mentioned as examples of tetracarboxylic acid dianhydrides; benzophenone-3,3',4,4'-tetracarboxylic acid dianhydride, pyromellitic acid dianhydride, naphthalene-2,3,6,7-tetracarboxylic acid dianhydride, naphthalene - 1,4,5,8-tetracarboxylic acid dianhyhydride, diphenyl - 3,3',4,4' - tetracarboxylic acid dianhydride and diphenyl ether-3,3',4,4'-tetracarboxylic acid dianhydride.

Preparation of the polyimides is carried out by reacting one of the above mentioned diamines with one of the aromatic tetracarboxylic acid dianhydrides at a temperature below 60° C., preferably from 0° C. to 50° C., in a polar organic solvent to produce a preliminary polyamidocarboxylic acid stage and converting this preliminary stage, optionally after a shaping operation, into the corresponding polyimide by thermal ring closure at a temperature of 100° C. to 350° C. or by chemical ring closure, using a cyclising agent such as a carbodiimide, an isocyanate, an acyl halide or a carboxylic acid anhydride, this reaction being carried out at a temperature of from 50° C. to 200° C. and optionally with the addition of a base such as pyridine.

The polar organic solvent used may be e.g. N-methyl pyrrolidone, dimethyl acetamide, dimethyl formamide, dimethyl sulphoxide or tetramethylene sulphone.

The diamine components and tetracarboxylic acid dianhydrides are advantageously used in equimolecular quantities but in principle the reaction may also be carried out with either of the components in excess. The reaction times for the preparation of the polyamidocarboxylic acid may vary between 1 and 3 hours. The solids content of the solutions should be 5 to 40% by weight, preferably 10 to 25% by weight.

The polyimides consisting of recurrent structural units of the general formula:

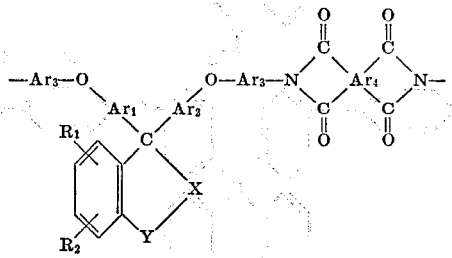

in which $Ar_1$, $Ar_2$, $Ar_3$, $R_1$, $R_2$, X and Y have the meanings explained above, preferably have softening points above 300° C. The thermostability of the polyimides is exceptionally high. Foils produced from these polymers can withstand tempering at 280° C. for at least 2 weeks.

The polyimides produced according to the invention are suitable for the production of foils, films, threads, fibres and other shaped products, and foils produced from these polymers are especially suitable for use as electrical insulating foils owing to their excellent thermal, mechanical and dielectric properties.

The following examples are to further illustrate the invention without limiting it.

EXAMPLE 1

575 parts by weight of N-phenyl-3,3-bis[4'-(p-aminophenoxy)-phenyl]-phthalimidine were dissolved in 2000 parts by weight of anhydrous dimethyl formamide. 218 parts by weight of pyromellitic acid dianhydride were then introduced portionwise at 5° C. to 10° C. When all the pyromellitic acid dianhydride had been added, stirring was continued for a total of 8 hours at room temperature and the reaction mixture was then gradually diluted with the amount of dimethyl formamide required to obtain a solution having a solids content of 15%. The solution, which then had a viscosity of 1430 poises, was poured out on glass plates to form films which, after drying for 1 hour at 80° C. to 90° C., were removed from the glass plate and suspended in a drying cupboard where they were redried at 100° C. to 120° C. for 2 hours. The foils were then carefully suspended in a drying cupboard which was heated to 270° C. to 280° C., where they were tempered for several hours. At 280° C., these foils become brittle only after 9 to 10 weeks. After tempering for 2 hours at 280° C., the foils are still completely soluble in hot dimethyl formamide. Solutions of these polyimide foils can again be worked up into films or threads.

The diamine used is prepaerd from N-phenyl-3,3-bis-(4'-hydroxyphenyl)-phthalimidine by reacting it with 2 mols of 4-nitrochlorobenzene in dimethyl sulphoxide in the presence of 2 mols of KOH, followed by catalytic reduction of the dinitro compound obtained.

EXAMPLE 2

Polyimide films having similar values for temperature resistance and solubility as the polyimide films described in Example 1 are obtained if in Example 1 the diamine used is replaced by the equivalent quantity of N-(p-phenoxy) - phenyl - 3,3 - bis - [4' - (p-aminophenoxy-phenyl]-phthalimidine. This diamine is preapred by reacting N-(p-phenoxy) - phenyl - 3,3 - bis-(4'-hydroxyphenyl)-phthalimidine with 2 mols of 4-nitrochlorobenzene in dimethyl sulphoxide in the presence of 2 mols of KOH, followed by catalytic reduction of the dinitro compound formed.

EXAMPLE 3

322 parts by weight of N-phenyl-3,3-bis-[4'-(p-amino-O - chlorophenoxy) - phenyl] - phthalimidine were dissolved in 1300 parts by weight of anhydrous dimethyl formamide. 109 parts by weight of pyromellitic acid dianhydride were then introduced portionwise at 10° C. to 15° C. and thereafter stirred at room temperature for 5 hours. At the same time, the solution was diluted with dimethyl formamide to reduce the solids content to about 15%. The viscosity of this diluted solution was 1620 poises. The solution was worked up to polyimide films as described in Example 1. At 280° C., these films only become brittle after 6 to 8 weeks. After tempering for 40 hours, at 270° C. to 280° C., the polyimide film is still soluble in hot dimethyl formamide. Solutions of such tempered polyimide films can be worked up again to foils, threads or moulded products.

N - phenyl - 3,3 - bis - [4' - (p-amino-o-chlorophenoxy]-phthalimidine was obtained by reacting N-phenyl-3,3-bis-(4-hydroxyphenyl)-phthalimidine with 2 mols of 3,4-dichloronitrobenzene in dimethyl sulphoxide in the presence of 2 mols of KOH, followed by catalytic hydrogenation of the resulting dinitro compound.

EXAMPLE 4

266 parts by weight of 9,9-bis-[4'-(p-amino-phenoxy) phenyl]-fluorene were reacted with 109 parts by weight of pyromellitic acid dianhydride in 1125 parts by weight of dimethyl formamide as described in Example 1. The highly viscous solution (1720 poises) obtained after dilution to a solids content of 15% was worked up into polyimide films as described in Example 1. After 45 minutes tempering at 280° C., these films were still to a large extent soluble in hot dimethyl formamide, and they became brittle only after about 8 weeks at 280° C.

9,9 - bis - [4' - (p - aminophenoxy)-phenyl]-fluorene was obtained by reacting 9,9-bis-(4'-hydroxyphenyl)-fluorene with 2 mols of 4-nitrochlorobenzene in dimethyl sulphoxide in the presence of 2 mols of KOH, followed by catalytic hydrogenation of the resulting dinitro compound.

EXAMPLE 5

280 parts by weight of 9,9-bis-[4'-(p-aminophenoxy)-phenyl]-anthrone were reacted with 109 parts by weight of pyromellitic acid dianhydride in 1150 parts by weight of anhydrous dimethyl formamide as described in Example 1. The highly viscous solution obtained by diluting to a solids content of 16% was worked up to form polyimide films as described in Example 1. After tempering for 3 days at 280° C., these films were still completely soluble in hot dimethyl formamide. Solutions of these polyimide films could be worked up again to foils, films, threads, coatings and moulded products. The polyimide films become brittle only after 7 to 8 weeks at 280° C.

9,9 - bis - [4' - (p - aminophenoxy)-phenyl]-anthrone was obtained by reacting 9,9 - bis - (4' - hydroxyphenyl)-anthrone with 2 mols of 4-nitrochlorobenzene in dimethyl sulphoxide in the presence of 2 mols of KOH and catalytically hydrogenating the resulting dinitro compound.

EXAMPLE 6

If in Example 3 pyromellitic acid dianhydride is replaced by the equivalent quantity of benzophenone-3,3',4,4'-tetracarboxylic acid dianhydride, the conditions and quantities being otherwise the same, a highly viscous solution which can be worked up to form polyimide films as described in Example 1 is obtained after dilution to a solids content of 15%. These films only become brittle after about 14 days at 200° C., and after tempering for 2 days at this temperature, they are still readily soluble in hot dimethyl formamide.

EXAMPLES 7 AND 8

If in Example 3 dimethyl formamide is replaced by the same quantity by weight of anhydrous dimethyl acetamide or anhydrous N-methyl pyrrolidone, keeping the proportions and conditions otherwise unchanged, polyimide films similar in their properties to the polyimide films described in Example 3 are obtained.

What we claim is:

1. A high molecular weight aromatic polyimide having a molecular weight of at least 10,000 and a softening point above 300° C., comprising 50–100 mole percent of recurring structural units of the formula:

wherein
$Ar_1$ and $Ar_2$ are each selected from the group consisting of and when $Ar_1$ and $Ar_2$ are joined together, $Ar_3$ is $R_1$ and $R_2$ are hydrogen, chlorine, or methyl;
X is —O—, where $R_3$ is hydrogen, methyl, phenyl, and p-phenoxyphenyl;
Y is different from X and is a single bond, $$\diagdown NR_3, \text{ or } -\underset{\underset{O}{\|}}{C}-;$$

$Ar_4$ is wherein the two valences in each six-membered ring are in ortho-position to each other; and correspondingly the remaining 50–0 mol percent of recurring structural units of the formula wherein $Ar_5$ is or 2. A polyimide of claim 1 having recurring structural units of the formula:

3. A polyimide of claim 1 having recurring structural units of the formula:

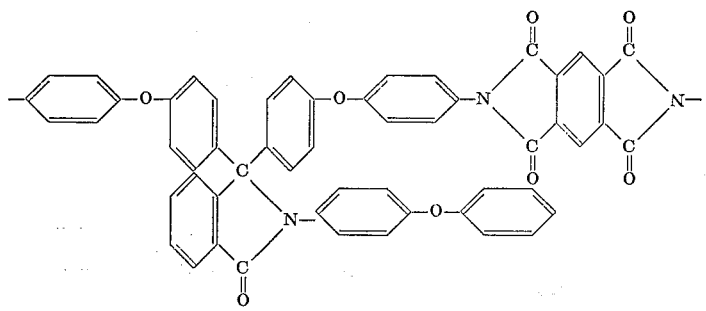

4. A polyimide of claim 1 having recurring structural units of the formula:

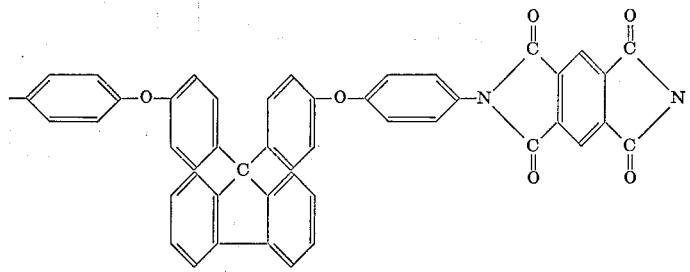

5. A polyimide of claim 1 having recurring structural units of the formula:

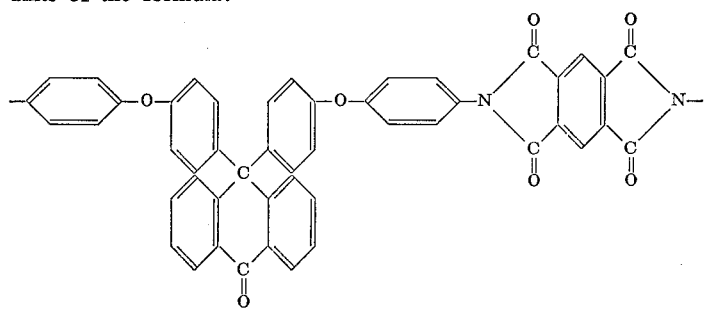

6. A polyimide of claim 1 wherein $Ar_1$ and $Ar_2$ have the formula:

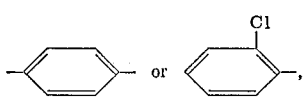

$Ar_3$ is

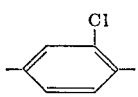

$R_1$ and $R_2$ are both hydrogen,
X is

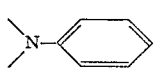

Y is

$Ar_4$ is

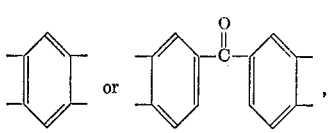

and there is 0 mol percent of recurring structural units having the formula:

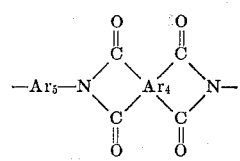

7. A shaped product consisting essentially of the polyimide of claim 1.
8. Electrical insulation consisting essentially of the polyimide of claim 1.
9. Solution of the polyimide of claim 1 in a polar organic solvent.
10. Solution of claim 9 wherein said polar organic solvent is N-methyl pyrrolidone, dimethylacetamide, dimethylformamide, dimethylsulfoxide, or tetramethylene sulfone.

References Cited
UNITED STATES PATENTS 3,179,634   4/1965   Edwards _____ 260—78
3,179,633   4/1965   Endrey _____ 260—78
3,179,630   4/1965   Endrey _____ 260—78

WILLIAM H. SHORT, Primary Examiner
L. L. LEE, Assistant Examiner

U.S. Cl. X.R.

117—128.4, 161 P, 161 UN; 260—30.8 R, 30.80 S, 32.6 N, 47 CP, 65, 78 TF

UNITED STATES PATENT OFFICE
CERTIFICATE OF CORRECTION

Patent No. 3,758,434            Dated September 11, 1973

Inventor(s) Hans-Egon Kunzel et al

It is certified that error appears in the above-identified patent and that said Letters Patent are hereby corrected as shown below:

Column 6, line 37 --Insert ---compounds of the following general formula---.

Column 11, Claim 6, Delete "or 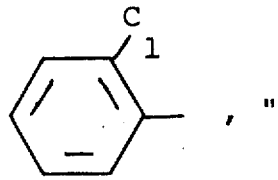 , "

Signed and sealed this 31st day of December 1974.

(SEAL)
Attest:

McCOY M. GIBSON JR.　　　　　　C. MARSHALL DANN
Attesting Officer　　　　　　　　Commissioner of Patents